(12) United States Patent
Schaefer, Jr. et al.

(10) Patent No.: US 9,867,022 B1
(45) Date of Patent: Jan. 9, 2018

(54) EMERGENCY SERVICES DUAL TONE MULTI FREQUENCY (DTMF) FUNCTION

(71) Applicant: Aeris Communications, Inc., Santa Clara, CA (US)

(72) Inventors: George Edward L. Schaefer, Jr., Tulsa, OK (US); Robert B. Fultz, Boulder Creek, CA (US); Steven A. Millstein, Dallas, TX (US)

(73) Assignee: Aeris Communications, Inc., San Jose, CA (US)

( * ) Notice: Subject to any disclaimer, the term of this patent is extended or adjusted under 35 U.S.C. 154(b) by 92 days.

(21) Appl. No.: 14/274,346

(22) Filed: May 9, 2014

Related U.S. Application Data

(60) Provisional application No. 61/924,153, filed on Jan. 6, 2014.

(51) Int. Cl.
*B60R 25/10* (2013.01)
*H04W 4/22* (2009.01)
*H04W 64/00* (2009.01)

(52) U.S. Cl.
CPC .............. *H04W 4/22* (2013.01); *H04W 64/00* (2013.01)

(58) Field of Classification Search
CPC ........................................... H04W 4/22
USPC ...................... 340/425.5, 436, 438, 988, 471
See application file for complete search history.

(56) References Cited

U.S. PATENT DOCUMENTS

| 5,815,073 | A  | * | 9/1998 | Gomez et al. | ................ 340/471 |
| 2003/0151501 | A1 | * | 8/2003 | Teckchandani | ....... B60R 25/102 340/426.19 |
| 2009/0138264 | A1 | * | 5/2009 | George | ................... H04M 3/02 704/251 |
| 2009/0190735 | A1 | * | 7/2009 | Gilmartin | ........... B60R 16/0373 379/201.12 |
| 2011/0063138 | A1 | * | 3/2011 | Berkobin | ............... G08G 1/207 340/988 |
| 2012/0075872 | A1 | * | 3/2012 | Byrne | .................. G08B 25/016 362/362 |
| 2013/0044008 | A1 | * | 2/2013 | Gafford | .................. G08G 1/205 340/989 |
| 2014/0028783 | A1 | * | 1/2014 | Kaltsukis | ......... G08B 13/19695 348/14.08 |

* cited by examiner

*Primary Examiner* — Brent Swarthout
(74) *Attorney, Agent, or Firm* — Brundidge & Stanger, P.C.

(57) ABSTRACT

A method and system for providing emergency location detection service for a vehicle is disclosed. The method and system comprise receiving one or more dual tone multi frequency (DTMF) signals by a vehicle via an active communication channel. The one or more DTMF signals are decoded and perform a corresponding vehicle function. A system and method in accordance with the present invention allows Public Safety Answering Point or 3rd party emergency service provider to send (DTMF) signals over a communication channel to activate vehicle system functions remotely such as engaging vehicle horn, flashing of headlights and/or taillights or emitting radio signals for the purpose of identification of location of the vehicle.

24 Claims, 5 Drawing Sheets

FIG. 3

Look Up Table Mapping

| DTMF Signal | Vehicle System Function |
|---|---|
| *1 | Lights |
| *2 | Horn |
| *3 | Siren |
| *4 | Radio Signal |
| *5 | Other |

EMERGENCY SERVICES DUAL TONE MULTI FREQUENCY (DTMF) FUNCTION

CROSS-REFERENCE TO RELATED APPLICATIONS

Under 35 USC 119(e), this application claims priority to U.S. provisional application Ser. No. 61/924,153, filed on Jan. 6, 2014.

FIELD OF THE INVENTION

The present invention relates generally to vehicles and more particularly to detection of vehicle location in an emergency situation via embedded telematics devices in such vehicles.

BACKGROUND

A public-safety answering point (PSAP) is a call center responsible for answering calls placed to an emergency telephone number for police, firefighting, and ambulance services. Trained telephone operators are also usually responsible for dispatching these emergency services. Most PSAPs are now capable of caller location for landline calls, and many can handle mobile phone locations, sometimes referred to as phase II location, where the mobile phone company has a handset location system.

Oftentimes a vehicle with cellular connectivity via embedded telematics device(s) will automatically establish a voice call to the PSAP for such emergency services. The PSAP will then dispatch the emergency services. However, there may be some circumstances where the vehicle is not in plain sight of the emergency service responders or may be located in an area that is not easy for emergency service responders to locate.

Hence, what is desirable is to provide a system and method which address the above identified issues. The system and method should be easily implemented, cost effective and adaptable to existing systems. The present invention addresses such a need.

SUMMARY

A method and system for providing emergency location detection service for a vehicle is disclosed. The method and system comprise receiving one or more dual tone multi frequency (DTMF) tones by a vehicle from an agent of a Public Safety Answering Point (PSAP) call center. The one or more DTMF tones signal and instruct the vehicle to perform a particular function. The method and system supports the ability to use DTMF tones to activate specific vehicle functions accessible through the in-vehicle system and communications bus.

A system and method in accordance with the present invention allows a PSAP or other third party emergency service provider to send DTMF signals over a communication channel as remote instructions to the vehicle to activate vehicle system functions such as engaging the vehicle horn, flashing the headlights and/or taillights or directing the vehicle to emit a radio or other similar signal for the purpose of location identification.

BRIEF DESCRIPTION OF THE DRAWINGS

FIG. 3 illustrates an example of a look-up table used for mapping vehicle system functions to DTMF tones received by the vehicle in accordance with an embodiment of the present invention.

DETAILED DESCRIPTION

The present invention relates generally to vehicles and more particularly to using in-vehicle embedded telematics devices to support detection of vehicle location in an emergency situation. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

As used herein the terms vehicle is intended to be inclusive, interchangeable, and/or synonymous with cars, trucks, motorcycles, tractors, vans and other similar vehicles for purposes of the present invention, though one will recognize that functionally each may have unique characteristics, functions and/or operations which may be specific to its individual capabilities and/or deployment.

Oftentimes a vehicle with cellular connectivity via embedded telematics device(s) will, upon detection of certain events (for example, deployment of air bags) or when a vehicle occupant engages a vehicle feature for connecting with emergency services, automatically establish a voice call or other emergency communication or signal (such as but not limited to text messages) to the Public Safety Answering Point (PSAP) for emergency services. The PSAP will then dispatch the emergency services to the location where the vehicle is believed to be located. However, there may be some circumstances where the vehicle is not in plain sight of the emergency services responders when they arrive or may be located in an area that is not easy for emergency services personnel to locate. Additional uses for such a system could include allowing vehicle owners to alert a PSAP upon certain other events, such as the theft of a vehicle, to assist police or other emergency personnel in locating the vehicle.

A dual tone multi frequency (DTMF) signal can be used to assist emergency services personnel with locating a vehicle in such an emergency situation by activating predetermined vehicle system functions. The DTMF signals sent by the agent of the PSAP or third party emergency service provider to the vehicle that needs emergency services are decoded and translated by a DTMF decoder in a system processor and logic in the vehicle into commands to activate specific predetermined vehicle systems and functions intended to assist with locating the vehicle. To describe the features of the present invention in more detail refer to the following discussion in conjunction with the accompanying figures.

Figure 1:
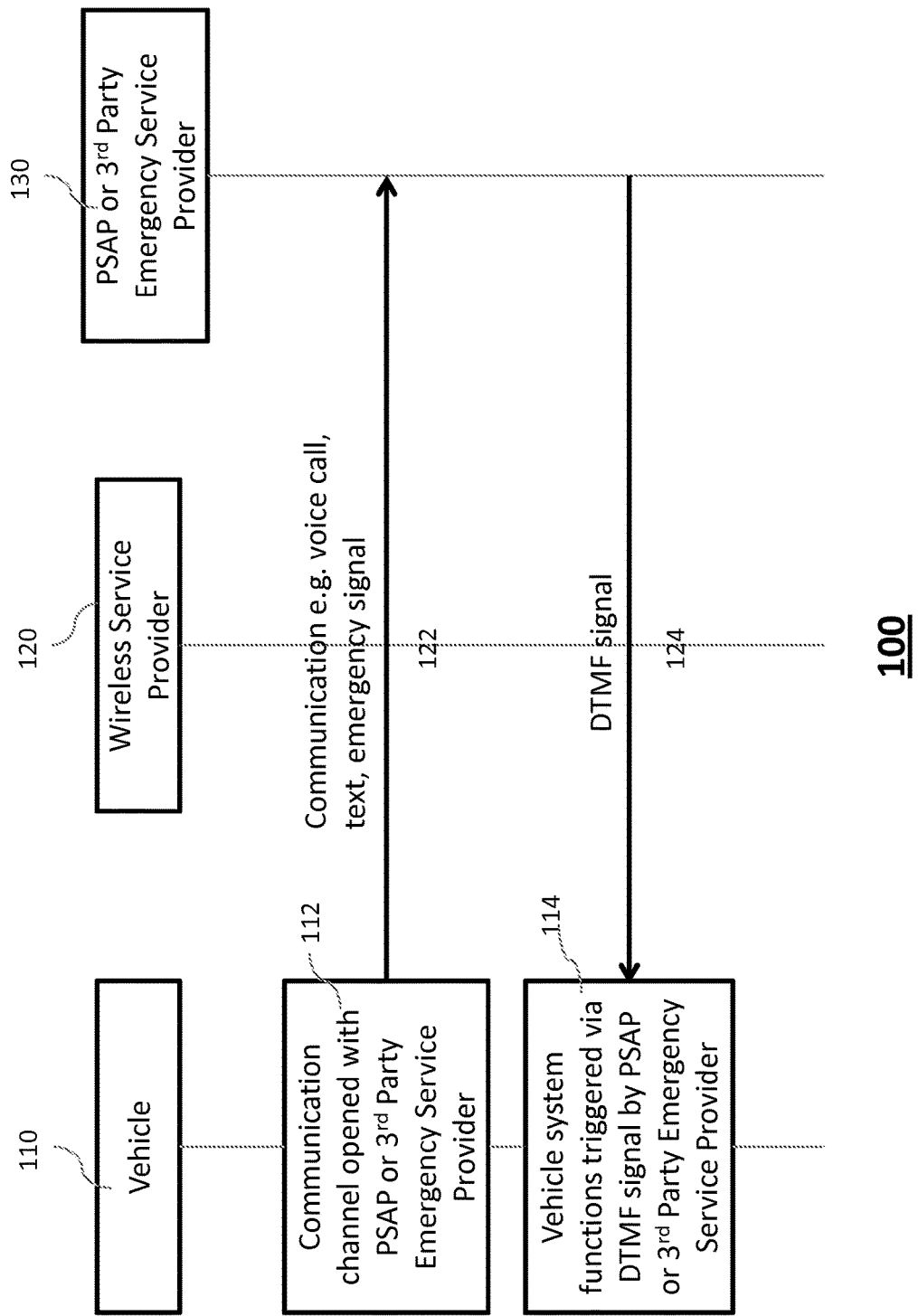
FIG. 1 is a flow diagram that illustrates a process of sending emergency communication to the PSAP and receiving a DTMF signal from the PSAP to trigger vehicle system functions in accordance with an embodiment of the present invention.

FIG. 1 is a flow diagram that illustrates a process of sending an emergency communication to a PSAP and receiving a DTMF signal from the PSAP to trigger vehicle system functions in accordance with one of the embodiments of the present invention. As is shown FIG. 1, vehicle 110 includes a telematics unit that can initiate an emergency communication 112 with a PSAP or third party emergency service provider 130; a wireless or telematics service provider 120 routes the communication via step 122. The process includes the PSAP or third party emergency service provider receiving the communication requesting emergency services and dispatching the services based upon the request.

As seen in the flow diagram 100, first a voice/communication channel is opened 112. This may be triggered by a person present at the scene, such as the driver or another occupant of the vehicle or even a passer-by, or by the vehicle itself through detection by sensors of certain events as a result of an accident or an emergency situation via step 122. Thereafter, the PSAP or third party emergency service provider 130 can trigger system functions on the vehicle intended to assist with locating the vehicle by sending a DTMF tone to the vehicle via step 124. In an embodiment, for example, *1 would activate the horn on the vehicle to alert emergency service responders of the vehicle's location. In another embodiment, *2 would cause the vehicle's headlights and/or taillights to flash 114.

In another embodiment of the invention, the vehicle can be equipped with a device or a system for emitting a signal, for example a radio frequency signal. The PSAP or third party emergency responder with an appropriate scanner can then detect the signal emitted by the vehicle to locate the vehicle.

In another embodiment of the invention, the system can be programmed to send the commands to the vehicle by DTMF a predetermined number of times or for a predetermined duration of time, so that the remote activation of the vehicle systems does not deplete available power resources. Similarly, in yet another embodiment, the system can be programmed such that a DTMF signal can activate performance of a vehicle function a predetermined number of times or for a predetermined duration of time for efficient use of power resources. Although the most obvious use of the invention is in a crash or accident type of emergency situation, it can also be used in "lost in blizzard" or "lost in wilderness" type of emergency situation and a situation involving theft or loss of a vehicle that could last from a few hours to several days. In such situations, locating the vehicle may be even more difficult, and it will be important not to deplete the vehicle's power resources by activating the system functions continuously or too frequently.

Figure 2:
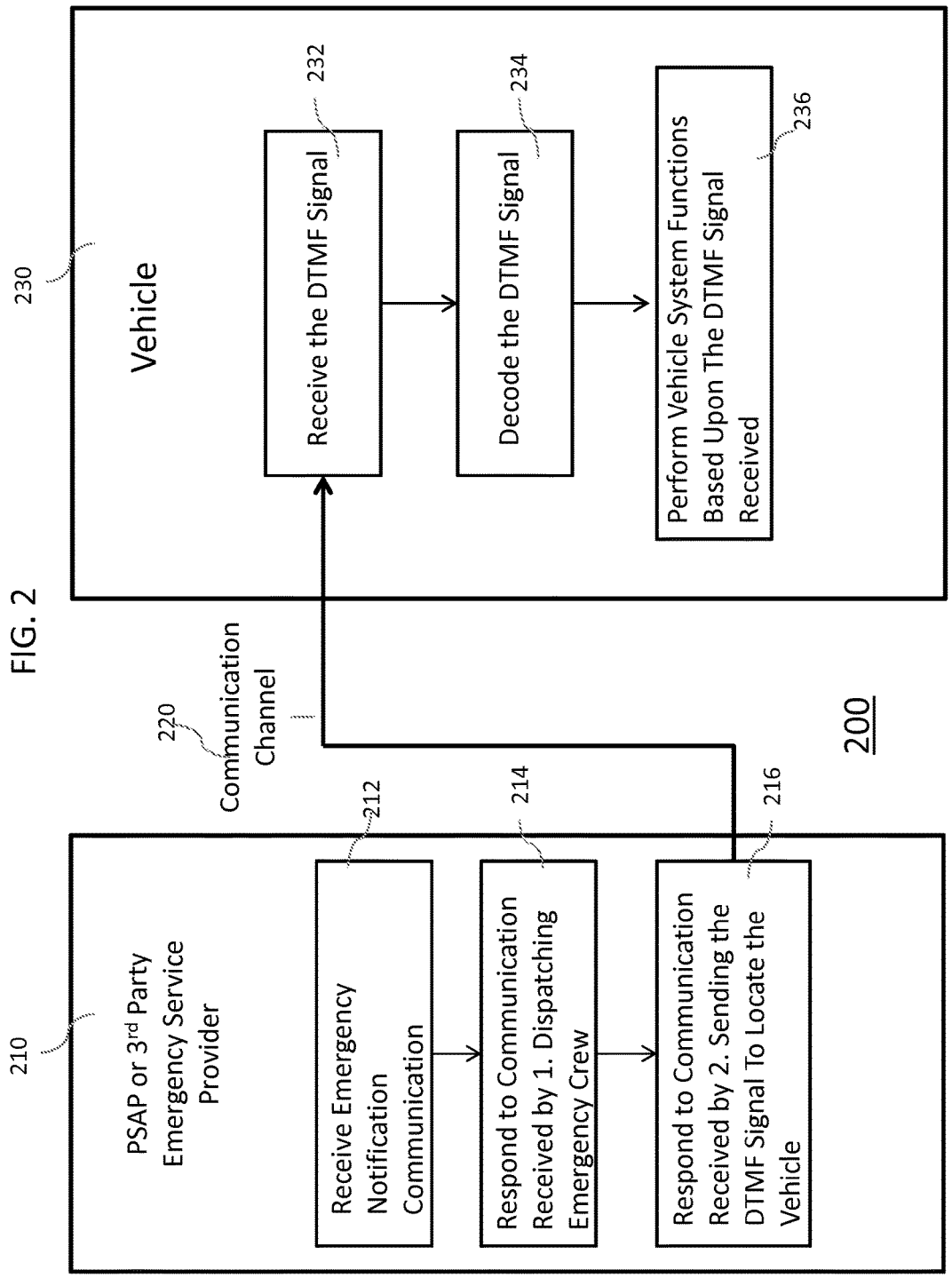
FIG. 2 is a flow diagram that illustrates a process of activating the appropriate vehicle system function based upon the DTMF tone received by the system in accordance with an embodiment of the present invention.

FIG. 2 is a flow diagram of a process for activating the appropriate vehicle systems based upon the DTMF tone received by the system processor and logic. First, the PSAP or other third party emergency service provider 210 receives an emergency notification communication 212 from the vehicle as described above. Next, the PSAP or other provider responds to the emergency notification communication received by: 1. dispatching the emergency crew 214 and 2. sending the DTMF signal 216 automatically or on request of emergency responders to the vehicle that sent the emergency request 230 to assist emergency service responders with locating the vehicle. This two way emergency communication takes place via a communication channel 220.

The telematics unit in the vehicle 230 receives the DTMF signal 232 sent by the PSAP or other emergency services provider and sends the signal to the system processor and logic (located within the telematics unit or elsewhere), which decodes the signal via step 234 into a set of commands for activating specified vehicle system functions via step 236, for example by mapping vehicle system functions (horn, lights, radio signal, etc.) to the DTMF signal received using look-up tables.

FIG. 3 illustrates an example of a look-up table according to one of the embodiments of the invention. The look-up table is an array containing pointer functions to process the input until a match is found. As used in this embodiment, a particular DTMF signal can be mapped to activation of a certain vehicle system function. For example, a horn could be activated by a DTMF tone corresponding to *1, or flashing of headlights and/or taillights could be performed by DTMF tone corresponding to *2.

Figure 4:
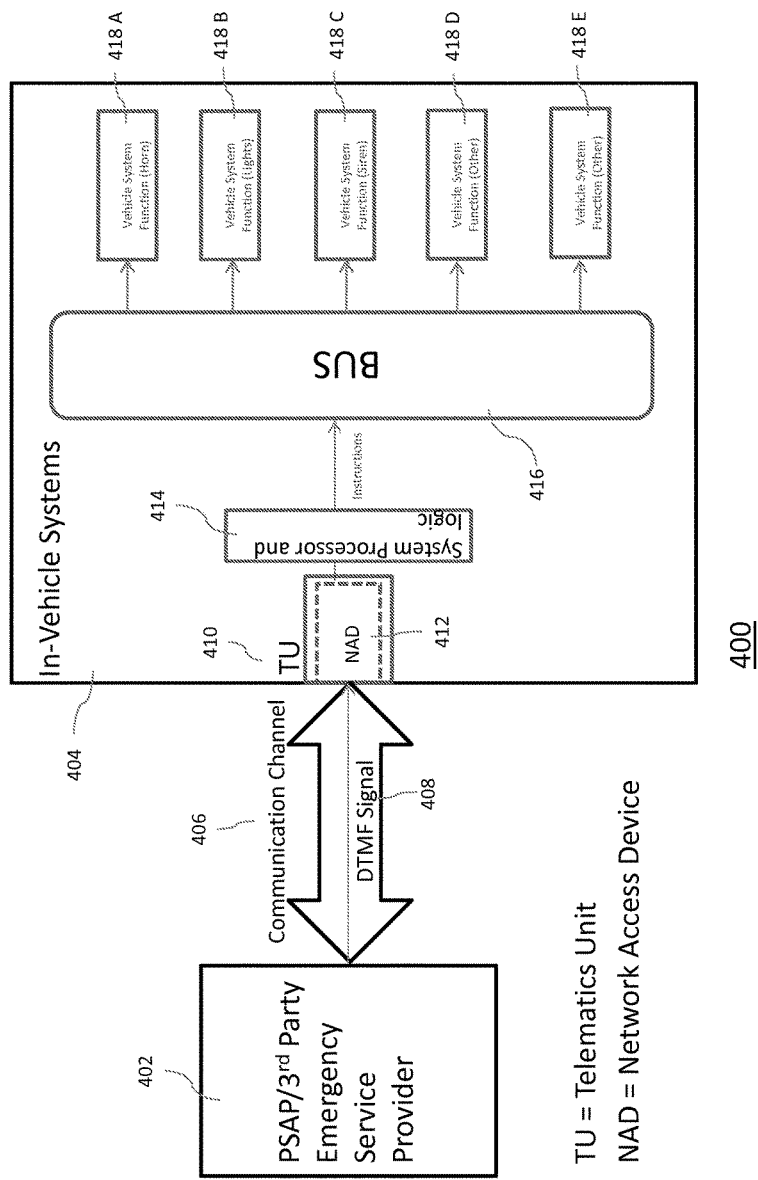
FIG. 4 illustrates a system for activating the appropriate vehicle system function based upon the DTMF tone received by the system processor and logic, in accordance with an embodiment of the present invention.

FIG. 4 illustrates a system for activating the appropriate vehicle system function based upon the DTMF signal received by the system processor and logic in accordance with an embodiment of the present invention. In this system 400, a communication from the vehicle to the PSAP or other emergency services provider 402 is initiated via the in-vehicle system 404, which includes a telematics unit (TU) 410 equipped with a network access device (NAD) 412. After receipt of that communication, the PSAP or other emergency services provider 402 communicates with the vehicle requesting emergency services 404 by sending a signal to the in-vehicle system via communication channel 406. After receiving the DTMF signals from the PSAP or other emergency services provider via the communication channel 406, the in-vehicle system provides data to the system processor and logic 414 based upon the signals received.

The system processor and logic 414 then provides instructions to the vehicle communications bus 416 based upon the data received by the NAD 412 to activate vehicle systems. The bus 416 then causes the appropriate vehicle system 418a-418e to activate. As mentioned above, the horn could be activated for example by a DTMF tone corresponding to *1 or flashing of headlights and/or taillights could be activated by DTMF tone corresponding to *2. One of ordinary skill in the art recognizes that many different types of DTMF signals could be utilized to enable the vehicle systems 418a-418e and their use would be within the spirit and scope of the present invention.

The process for activation of the appropriate vehicle system 404 is performed by the system processor and logic 414 based upon the DTMF signal received. In this embodiment the system processor and logic 414 contains the process for detecting the DTMF signal by the vehicle TU 410, but it is well understood by one of ordinary skill in the art that the process could be initiated by the PSAP if the logic resided there within.

Figure 5:
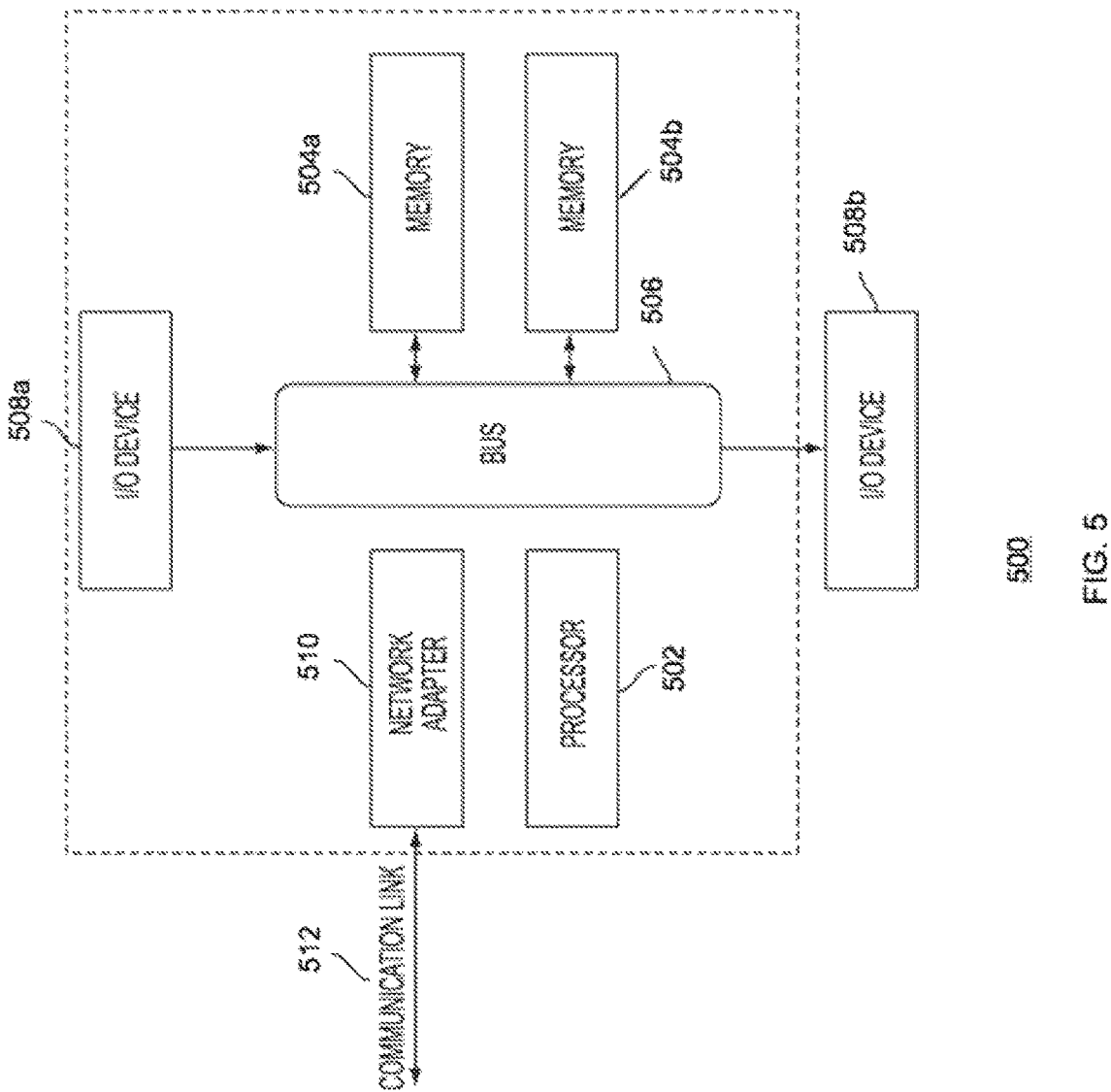
FIG. 5 illustrates a data processing system 500 suitable for storing the computer program product and/or executing program code relating to the choices of the users in accordance with an embodiment of the present invention.

FIG. 5 illustrates a data processing system 500 suitable for storing the computer program product and/or executing program code in accordance with an embodiment of the present invention. The data processing system 500 includes a processor 502 coupled to memory elements 504a-b through a system bus 506. In other embodiments, the data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to the data processing system 500. I/O devices 508a-b may be coupled to the data processing system 500 directly or indirectly through intervening I/O controllers (not shown).

In FIG. 5, a network adapter 510 is coupled to the data processing system 502 to enable data processing system 502 to become coupled to other data processing systems or remote printers or storage devices through communication link 512. Communication link 512 can be a private or public network. Modems, cable modems, and Ethernet cards are just a few of the currently available types of network adapters.

Embodiments of the process described herein can take the form of an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

A system and method in accordance with the present invention has several advantages over the existing systems. This system uses existing communications systems used by PSAPs and therefore requires no infrastructure or systems changes at the PSAP to provide the features described to enable more effective location of vehicles in emergency situations. The system provides enhanced emergency services for the public.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "cellular communication" is understood to include various methods of connecting any type of computing or communications devices, servers, clusters of servers, using wired and/or wireless communications networks to enable processing and storage of signals and information, and where these services may be accessed by applications available through a number of different hardware and software systems, such as but not limited to a web browser, terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "communications network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for detecting location of a vehicle during an emergency situation comprising:
   receiving, by the vehicle, one or more dual tone multi frequency (DTMF) signals sent by an emergency service provider in response to the emergency situation,
      wherein a two way communication channel is opened with the emergency service provider by the vehicle through detection of certain events by one or more sensors as a result of the emergency situation,
      wherein the one or more DTMF signals received via the two way communication channel are transmitted as a command to a DTMF receiver integrated in the vehicle,
      wherein the one or more DTMF signals are applied to a lookup table which has mapped therein in corresponding relation DTMF signals and vehicle system functions, and
      wherein signals corresponding to one or more predetermined vehicle system functions are output from the lookup table corresponding to the one or more DTMF signals applied to the lookup table; and activating, by the vehicle, the one or more predetermined vehicle system functions, such that activating the one or more predetermined vehicle system functions by the vehicle are triggered by the one or more DTMF signals sent by the emergency service provider.

2. The computer-implemented method of claim 1, wherein the one or more predetermined vehicle system functions comprises any of activating a light-generating system of the vehicle, activating a sound-producing system of the vehicle, emitting a wireless signal and a combination thereof.

3. The computer-implemented method of claim 2, wherein activation of light-generating system of the vehicle comprises flashing headlights and tail lights of the vehicle.

4. The computer-implemented method of claim 2, wherein activation of sound-producing system of the vehicle comprises honking a horn of the vehicle.

5. The computer-implemented method of claim 2, wherein activation of sound-producing system of the vehicle comprises playing a siren of the vehicle.

6. The computer-implemented method of claim 2, wherein activation of wireless signal generating system of the vehicle comprises emitting a radio signal from the vehicle.

7. The computer-implemented method of claim 1 further comprises activating the one or more predetermined vehicle system functions for a predetermined period of time.

8. The computer-implemented method of claim 1 further comprises activating the one or more predetermined vehicle system functions a predetermined number of times.

9. A system for detecting location of a vehicle during an emergency comprising:
a processor, and
a memory in communication with the processor wherein the memory containing program instructions which when executed by the processor, perform the following operations comprising:
receiving, by the vehicle, one or more dual tone multi frequency (DTMF) signals sent by an emergency service provider in response to the emergency,
wherein a two way communication channel is opened with the emergency service provider by the vehicle through detection of certain events by one or more sensors as a result of the emergency situation,
wherein the one or more DTMF signals received via the two way communication channel are transmitted as a command to a DTMF receiver integrated in the vehicle,
wherein the one or more DTMF signals are applied to a lookup table which has mapped therein in corresponding relation DTMF signals and vehicle system functions, and
wherein signals corresponding to one or more predetermined vehicle system functions are output from the lookup table corresponding to the one or more DTMF signals applied to the lookup table; and
activating, by the vehicle, the one or more predetermined vehicle system functions, such that activating the one or more predetermined vehicle system functions by the vehicle are triggered by the one or more DTMF signals sent by the emergency service provider.

10. The system of claim 9, wherein the one or more predetermined vehicle system functions comprises any of activating a light-generating system of the vehicle, activating a sound-producing system of the vehicle, emitting a wireless signal and a combination thereof.

11. The system of claim 10, wherein activation of light-generating system of the vehicle comprises flashing headlights and tail lights of the vehicle.

12. The system of claim 10, wherein activation of sound-producing system of the vehicle comprises honking a horn of the vehicle.

13. The system of claim 10, wherein activation of sound-producing system of the vehicle comprises playing a siren of the vehicle.

14. The system of claim 10, wherein activation of wireless signal generating system of the vehicle comprises emitting a radio signal from the vehicle.

15. The system of claim 9 further comprising program instructions for:
activating the one or more predetermined vehicle system functions for a predetermined period of time.

16. The system of claim 9 further comprising program instructions for:
activating the one or more predetermined vehicle system functions a predetermined number of times.

17. A computer program product stored on a non-transitory computer readable medium for detecting location of a vehicle, comprising computer readable programming for causing a computer to perform the operations to detect the location of a vehicle during an emergency situation comprising:
receiving, by the vehicle, one or more dual tone multi frequency (DTMF) signals sent by an emergency service provide in response to the emergency situation,
wherein a two way communication channel is opened with the emergency service provider by the vehicle through detection of certain events by one or more sensors as a result of the emergency situation,
wherein the one or more DTMF signals received via the two way communication channel are transmitted as a command to a DTMF receiver integrated in the vehicle,
wherein the one or more DTMF signals are applied to a lookup table which has mapped therein in corresponding relation DTMF signals and vehicle system functions, and
wherein signals corresponding to one or more predetermined vehicle system functions are output from the lookup table corresponding to the one or more DTMF signals applied to the lookup table; and
activating, by the vehicle, the one or more predetermined vehicle system function, such that activating the one or more predetermined vehicle system functions by the vehicle are triggered by the one or more DTMF signals sent by the emergency service provider.

18. The computer program product of claim 17, wherein the one or more predetermined vehicle system functions comprises any of activating a light-generating system of the vehicle, activating a sound-producing system of the vehicle, emitting a wireless signal and a combination thereof.

19. The computer program product of claim 18, wherein activation of light-generating system of the vehicle comprises flashing headlights and tail lights of the vehicle.

20. The computer program product of claim 18, wherein activation of sound-producing system of the vehicle comprises honking a horn of the vehicle.

21. The computer program product of claim 18, wherein activation of sound-producing system of the vehicle comprises playing a siren of the vehicle.

22. The computer program product of claim 18, wherein activation of wireless signal generating system of the vehicle comprises emitting a radio signal from the vehicle.

23. The computer program product of claim 17 further comprises performing the one or more predetermined vehicle system functions for a predetermined period of time.

24. The computer program product of claim 17 further comprises performing the one or more predetermined vehicle system functions a predetermined number of times.

* * * * *